Oct. 27, 1970 J. J. FRIEND 3,537,001
MULTIFREQUENCY TONE DETECTOR
Filed Dec. 5, 1968
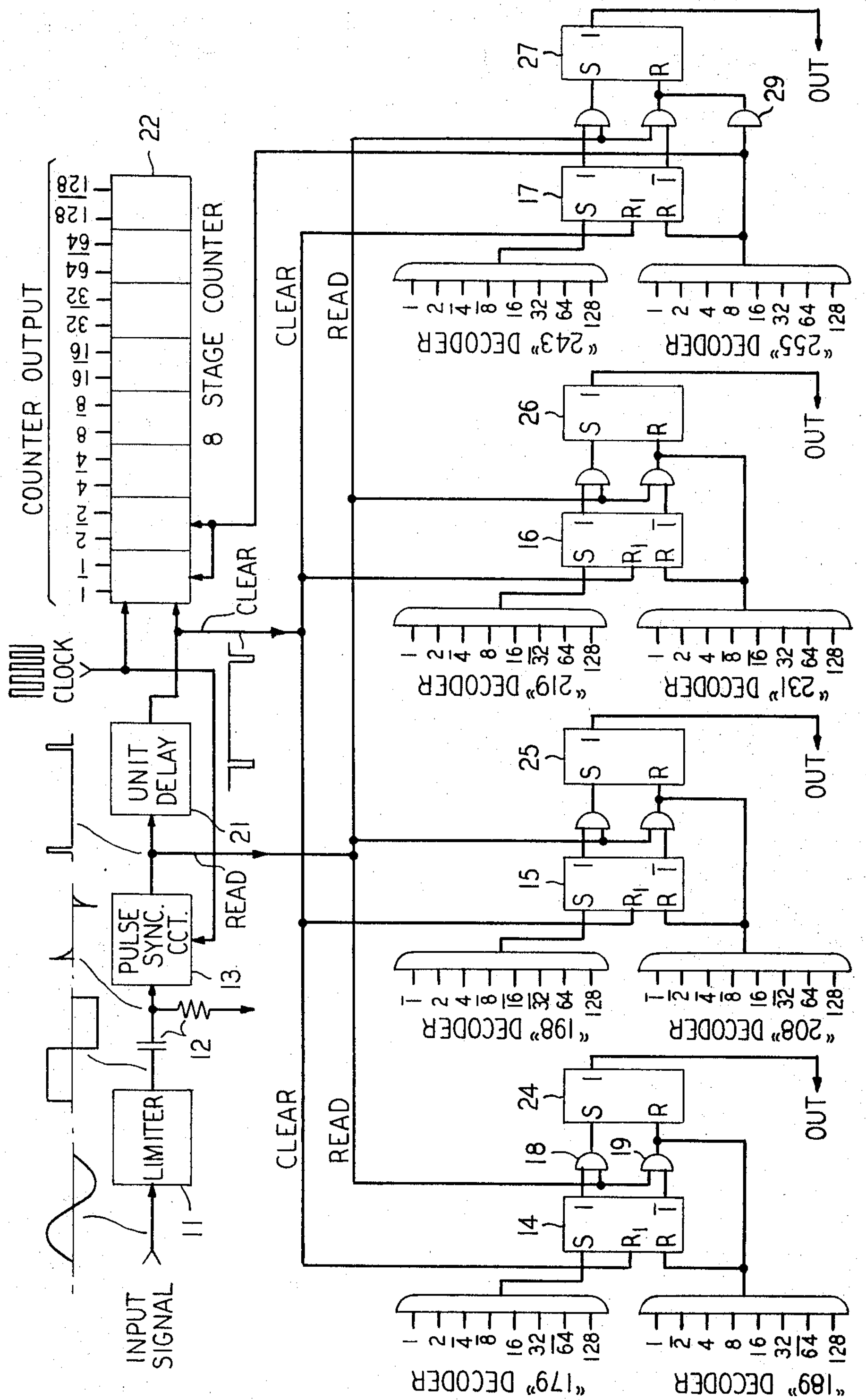
INVENTOR
J. J. FRIEND
BY John K. Mullarney
ATTORNEY United States Patent Office 3,537,001

Patented Oct. 27, 1970

3,537,001

MULTIFREQUENCY TONE DETECTOR

Joseph J. Friend, Freehold Township, Monmouth County, N.J., assignor to Bell Telephone Laboratories, Incorporated, Murray Hill and Berkeley Heights, N.J., a corporation of New York Filed Dec. 5, 1968, Ser. No. 781,461
Int. Cl. G01r *23/02*
U.S. Cl. 324—78 6 Claims

ABSTRACT OF THE DISCLOSURE

This disclosure relates to a tone detector circuit which performs a frequency measurement function by timing the intervals between alternate zero-crossings of the input waveform. This is done using a multistage binary counter driven by a reference clock signal. The counter is reset to zero immediately after detection of a given first zero crossing and subsequently read-out upon detection of the third zero crossing. The counter output states at the instant they are read determine the period of the wave and conseqently the fundamental frequency thereof. Decoder logic, connected in a predetermined manner to the counter output, establishes clock count bands which correspond to the recognition bandwidth limits of the multiplicity of tones to be detected; a distinct output indication is provided if the count in the counter, at the read instant, falls within one of said clock count bands.

BACKGROUND OF THE INVENTION

This invention relates to a multifrequency detector for use in decoding frequency coded decimal digits in a telephone system.

The complexity and the cost of dialing equipment in a telephone office have been considerably reduced with the advent of voice frequency coded digit transmission since the same channel may be employed for both voice and digit transmission. The particular type of telephone digit transmission system now gaining widest acceptance uses the so-called 4 x 4 code. This code embodies two groups of frequencies which will be called, for purposes of clarity, the high frequency group and the low frequency group. Each group of frequencies comprises four individual frequencies and the concurrence of a selected pair of these freqencies, one from each group, represents a decimal digit. The generation of the frequencies representative of a particular digit may be accomplished by a generator such as the multifrequency tone dialer, the operation of which is disclosed in the patent to L. A. Meacham et al., No. 3,184,554, issued May 18, 1965.

Two prime requirements of a multifrequency tone detector, for use in the telephone plant, are good selectively and rapid response. That is, the detector must be sufficiently selective as to guard against digit simulation (operation in the presence of a signal resembling in some way a valid tone signal) by speech or other noise introduced at the telephone transmitter; and, to provide an acceptable speed of service, the detector must be quick to respond to a valid tone signal. Now it has been the practice heretofore to use groups of tuned circuits (i.e., LC resonant circuits) for the detection of the multifrequency tone signals. However, as known to those skilled in the art, the typical LC resonant circuit suffers from a decrease in quickness of response with increased selectivity. Accordingly, the design engineer must "trade-off" speed of response against selectivity. That is, one can't have it both ways. To achieve rapid response some sacrifice in selectivity must be made, and vice versa.

It is a primary object of the present invention to improve the detection of frequency coded decimal digits in telephone systems.

A related object is to provide a multifrequency tone detector which can be as frequency selective as necessary, while at the same time being quick to respond to a valid signal.

Multifrequency tone detectors are generally time-shared, at the central office, between a number of subscriber lines. Nevertheless, the number of detectors needed in the telephone plant is still so great that the cost, size and complexity thereof are of prime consideration. And here again, the prior art LC resonant circuit arrangements are not without their shortcomings. Typically, they are bulky and more costly than one might desire.

It is, therefore, a further object of the invention to provide a multifrequency tone detector which is simple, compact and economical.

SUMMARY OF THE INVENTION

In accordance with the present invention a digital tone detector is utilized in decoding the frequency coded decimal digits used for signaling in a telephone system. Tone detection is accomplished by timing the intervals between alternate zero crossings of the input tone waveform. To this end, a multistage binary counter is driven by a reference clock source of relatively high clock frequency. The counter is reset to zero immediately after detection of a given first zero crossing and subsequently "read" upon detection of the third or next alternate zero crossing. The counter output states, at the instant the counter is read, determine the period of the waveform and hence the fundamental frequency of input tone signal. Decoder logic, connected in a predetermined manner to the counter output, establishes clock count bands which correspond to the recognition bandwidth limits of the multiplicity of tones to be detected. A distinct output indication of tone is provided if the count in the counter, at the read instant, falls within one of the clock count bands established by the decoder logic.

In accordance with a feature of the invention, inhibit logic is used to prevent operation in response to signals other than those tones in the frequency bands of interest.

BRIEF DESCRIPTION OF THE DRAWING

The single figure is a detailed block diagram schematic of a multifrequency tone detector in accordance with the principles of the present invention.

DETAILED DESCRIPTION

As indicated hereinbefore, the multifrequency tone detector of the present invention is intended for use in a telephone signaling arrangement wherein the digit-calling information is coded in the form of two frequencies in the voice frequency range, each chosen from a distinct group of frequencies, and transmitted simultaneously to the telephone central office. The total number of signal frequencies is eight, divided into two groups of four (i.e., a low frequency group and a high frequency group), and a valid signal is made up of one frequency from each group of four.

Because of manufacturing variations, temperature effects, et cetera it has been found that the generated multifrequency tones vary slightly from telephone to telephone. To account for this and yet maintain adequate discrimination against unwanted signals, a five percent recognition bandwidth has been settled upon. If a received signal tone falls within this limited bandwidth, it will be accepted as a valid tone.

The following table lists eight typical signal frequencies (Hz.) or tones to be detected and the five percent recognition bandwidth limits for each.

| Low Group | | | High Group | | |
|---|---|---|---|---|---|
| 1179 | 1209 | 1239 | 680 | 697 | 714 |
| 1303 | 1336 | 1369 | 751 | 770 | 789 |
| 1440 | 1477 | 1514 | 831 | 852 | 873 |
| 1592 | 1633 | 1674 | 917 | 941 | 965 |

The center columns give the nominal tones for the two groups.

Considering the four tones of the low frequency group, the longest period corresponds to the lowest frequency of interest, namely, 680 Hz. A full period, at this frequency, is 1471 microseconds (μsec.) The upper edge of the lowest frequency band is 714 Hz. which has a period of 1400 μsec. Thus, if the occurrence of an axis crossing starts a clock and a subsequent crossing event (i.e., the next alternate zero crossing) stops the clock it can be said that a valid tone has been received if the clock was stopped at a time between 1400 and 1471 μsec.

If the clock was stopped between the time of 1036 and 1091 μsec. we would conclude that a tone was received having a frequency between 917 and 965 Hz., the highest frequency band in the low group. It should thus be apparent that a single clock might be used for measuring all four frequencies in a single group, since, in a valid signaling sequence, only one tone of each group will be present at any given time. If two tones were present in a single group or if excessive interference of some nature accompanied the valid tone the zero crossing intervals would neither be constant nor of acceptable duration and detection would be prevented or inhibited, as will be evident hereinafter.

The following table lists the periods corresponding to the band edges of the low group.

| Nominal Tone, Hz. | Band Edge Periods, μsec. | |
|---|---|---|
| 697 | 1400 | 1471 |
| 770 | 1267 | 1332 |
| 852 | 1145 | 1203 |
| 941 | 1036 | 1091 |

Now in accordance with the invention a multistage binary counter, driven by a reference clock signal, is used to measure the periods of the input waveforms. The desired band edge resolution will dictate the clock frequency, i.e., the "fineness" of the desired measurement will specify the number of divisible units in the time scale. For the use intended, acceptable band edge resolution is achieved if the time measuring scale is divided into 256 units ($2^8$). A full count of 256 will correspond to the longest period to be measured, i.e., 1471 μsec. The clock frequency for the low group is thus dictated to be:

$$\frac{256}{1471\mu\text{sec.}}=174.0kHz$$

The minimum time unit of measure is 5.746 μsec.

The following table gives the clock counts corresponding to the band edge periods of the immediately preceding table.

| Nominal Frequency | Band Edge Clock Counts | |
|---|---|---|
| 697 | 244 | 256 |
| 770 | 220 | 232 |
| 852 | 199 | 209 |
| 941 | 180 | 190 |

Now since the band edge periods are, in turn, determined by the preselected recognition bandwidth limits, it will be evident that the above-listed band edge clock counts establish four clock count bands which correspond to the recognition bandwidth limits of the four nominal tones of the low group.

Because of the same geometric relationships between the frequencies of the high and low groups, the band edge clock counts are identical for both groups. The only thing that distinguishes the high group detector from the low group one is the clock frequency used, the circuitry is identical. The clock frequency for the high group is computed to be 301.8 kHz.

Referring now to the drawing, the tone signals generated at a subscriber location are received at a central office where the two groups are separated by means of band pass filters (not shown). The high and low groups of tones are then respectively delivered to separate digital tone detectors such as shown in the drawing. Under normal operating conditions the signal tones of a given group are presented sequentially to the detector circuit.

An incoming tone signal, of generally sinusoidal configuration, is applied to the limiter 11 where it is "squared-up" to approximately square-wave form, after which zero crossing spikes are produced by the RC differentiator circuit 12. Circuitry of the above nature is well known in the art. The positive spikes, or negative spikes—the choice being with the circuit designer, are applied as gate signals to the pulse sync circuit 13; clock pulses derived from a source (not shown) of known periodicity are also coupled to circuit 13. As indicated hereinbefore, the clock frequency is quite high with respect to the multifrequency tones to be detected. A positive spike gates the pulse sync circuit ON and the first clock pulse immediately thereafter is thus permitted to pass; the clock pulse then functions to reset the pulse sync circuit. In this reset state all subsequent clock pulses are "blocked" until the circuit 13 is once again gated ON by a positive going spike applied to the input. The READ pulses emerging from the pulse sync circuit are thus in synchronism with the clock timed operation of the remaining detector circuitry so as to assure proper sequential performance. As will be appreciated by those in the art, the pulse synchronization provided by circuit 13 can be obtained in a number of relatively straight forward fashions.

The READ pulses from the pulse sync circuit 13 are used to read out the states of the four temporary stores 14–17 into the hold circuits 24–27. These stores and hold circuits may typically be comprised of conventional flip-flops. The read out operation is carried out by delivering the READ pulses as enabling signals to the appropriate AND gates, such as gates 18 and 19. Initially it can be assumed that the temporary stores 14–17 are empty so that all the hold circuits 24–27 are set to the "0" state by said read out operation.

The READ pulses from the pulse sync circuit 13 are delayed one clock period in unit delay 21 and then used to CLEAR all stages of the eight stage counter 22 and all the temporary stores 14–17. The stores 14–17 are cleared or set to the "0" state by delivering the CLEAR pulses to the reset terminals $R_1$ of the stores. The unit delay insures that the information in the temporary stores is read out prior to the resetting of the latter.

The counter 22 is reset to its zero condition by a CLEAR pulse and thereafter it advances or counts in a typical binary counting fashion in response to the clock pulses coupled to the input thereof. The binary counter 22 comprises eight stages and hence it will count to 255, recycle to 0 and begin once again, if not reset or inhibited. The counter can be of most any conventional configuration.

The pairs of decoders ("179" and "189"; "198" and "208", etc.) are used to establish the aforementioned clock count bands which correspond to the recognition bandwidth limits of the plurality of input tones to be detected. The decoders are of AND gate configuration; the input of each decoder is coupled to the output leads of the counter 22 in the designated manner. To keep the drawing relatively simple, airline connections from the counter output to the various decoders are utilized. Each counter stage has two output leads and each decoder is coupled to one or the other of the output leads of each counter stage. The output leads of the counter stages have been labeled using a conventional notation. For example, the output of the first stage of the counter consists of a one (1) and a not-one ($\bar{1}$) lead. If this stage is set to its "1" state, the (1) output lead is energized, whereas with the stage set to its "0" state, the ($\bar{1}$) output lead is energized.

Now because of the unit delay between the READ and CLEAR pulses, the count registered by the counter 22 will always be one clock count less than the total number of clock cycles that occur between alternate zero crossings of the input waveform. This accounts for the apparent count discrepancy (of one clock count) between the band edge clock counts listed in the last of the above tables and the band edge clock counts established by the decoder logic.

Assuming a valid input tone, the counter will be reset to zero and then, once again, begin counting the input clock pulses coupled thereto. When the counter has counted 179 clock pulses the "179" decoder sets the temporary store 14 to its "1" state. If a second pulse subsequently emerges from the pulse sync circuit 13 before the counter reaches the count of 189, the "1" in the temporary store 14 will be read into the hold circuit 24 via the enabled AND gate 18. The (1) output lead of hold circuit 24 is thus energized, which indicates that a zero crossing interval of acceptable duration has been received, e.g., a 941 Hz. signal tone has been received, if the detector is connected to receive the low frequency group.

If the counter reaches 189 before the next zero crossing occurs, the "189" decoder serves to reset the temporary store 14 to its "0" state. The counter then continues to count through the following bands where a similar operation of the decoder logic takes place. In the presence of a valid input tone one, and only one, of the temporary stores will be set to the "1" state at the read time thereof.

The "189," "208," "231" and "255" decoders have their output leads connected directly to the reset terminals of temporary stores 14, 15, 16, and 17, respectively; these output leads are also respectively connected to the reset terminals of hold circuits 24, 25, 26, and 27. Accordingly, as the count in the counter reaches the clock counts of 189, 208, 231, and 255 the associated temporary stores and hold circuits are immediately reset. Any output indication from a hold circuit is thus quickly terminated when the responsible input signal tone ceases. The single input AND gate 29, connected in the output lead of the "255" decoder, is for isolation purposes.

If the counter reaches a count of 255 before the next zero crossing occurs, the "255" decoder resets the temporary store 17 and the hold circuit 27, as heretofore described, and in addition it stops counter operation by direct-setting the first two counter stages. In this manner, the counter will be "latched-up" and will not recycle until it is once again cleared. This procedure prevents a possible false indication with certain frequencies lower than those of interest, e.g., certain subharmonics.

From the foregoing it will be apparent that the instant tone detector circuit produces a distinct output indication of the input signal immediately after the detection of the first zero crossing interval of accepted duration. This output indication appears as an energizing signal on one, and only one, of the hold circuit leads. The output indication will be continuous as long as the in-band tone is received; and the output indication is terminated no later than approximately one cycle period after the input tone has ceased.

The output indications from the several hold circuits are ultimately delivered to a call signal register where they are accumulated and stored until the signaling sequence is complete. The register than functions in conjunction with the other central office equipment to set up the call through the office.

The action of the decoder logic and the latch-up of the counter, as heretofore described, serve to inhibit operation in response to signals other than those in the frequency bands of interest.

The recognition bandwidth limits (i.e., frequency selectivity) can be made very narrow while maintaining the same accuracy as the clock source. Band edge resolution can be chosen at will and the same increases exponentially with the addition of counter stages and an increase in clock frequency. The instant detector, in addition, possesses excellent discrimination against signals other than those desired; signals having the proper interval between zero crossings are a small class of waveforms.

The eight nominal tones and the recognition bandwidth limits listed in the first table are recited for illustrative purposes only and it should be evident at this point that the principles of the invention are in no way limited thereto. Accordingly, it is to be understood that the above described arrangement is merely illustrative of the principles of the present invention and numerous modifications and variations in the described embodiment may be devised by those skilled in the art without departing from the spirit and scope of the invention.

What is claimed is:

1. A multifrequency tone detector comprising a multistage counter, a source of clock pulses of known periodicity, the clock frequency of said source being relatively high with respect to the multifrequency tone signals to be detected, means coupling said clock pulses to said counter to establish a typical counting operation therein, means for setting the counter to an initial condition immediately after the occurrence of a given first zero crossing of an input waveform, means for reading the output state of the counter upon the occurrence of a given subsequent zero crossing of said input waveform, decoder means connected to the counter output and serving to establish clock count bands which correspond to the recognition bandwidth limits of the plurality of input tones to be detected, and means coupled to said decoder means for providing a distinct output tone indication when the count in the counter at the read time thereof falls within one of said clock count bands.

2. A multifrequency tone detector as defined in claim 1 including means for temporarily inhibiting said counting operation when the count reaches a predetermined number.

3. A multifrequency tone detector as defined in claim 2 wherein a distinct output indication is produced immediately after the detection of the first zero crossing interval of accepted duration.

4. A multifrequency tone detector as defined in claim 3 wherein said output tone indication is maintained as long as the initiating in-band tone signal is received.

5. A multifrequency tone detector as defined in claim 4 including means for terminating said output tone indication within substantially one cycle period after said in-band tone signal has ceased.

6. A multifrequency tone detector as defined in claim 5 wherein each clock count band is established by a pair of AND gate means each of which is connected in a predetermined manner to each stage of the counter.

References Cited

UNITED STATES PATENTS

| | | |
|---|---|---|
| 2,992,384 | 7/1961 | Malbrain. |
| 3,039,685 | 6/1962 | Bagley et al. |
| 3,413,449 | 11/1968 | Brown. |

ALFRED E. SMITH, Primary Examiner

U.S. Cl. X.R.

324—68; 328—138